United States Patent [19]
Hultquist et al.

[11] Patent Number: 6,132,492
[45] Date of Patent: Oct. 17, 2000

[54] SORBENT-BASED GAS STORAGE AND DELIVERY SYSTEM FOR DISPENSING OF HIGH-PURITY GAS, AND APPARATUS AND PROCESS FOR MANUFACTURING SEMICONDUCTOR DEVICES, PRODUCTS AND PRECURSOR STRUCTURES UTILIZING SAME

[75] Inventors: Steven J. Hultquist, Raleigh, N.C.; Glenn M. Tom, Milford, Conn.; Peter S. Kirlin, Newtown, Conn.; James V. McManus, Danbury, Conn.

[73] Assignee: Advanced Technology Materials, Inc., Danbury, Conn.

[21] Appl. No.: 09/082,596

[22] Filed: May 21, 1998

Related U.S. Application Data

[63] Continuation-in-part of application No. 08/809,019, filed as application No. PCT/US95/13040, Oct. 13, 1995, Pat. No. 5,935,305, which is a continuation-in-part of application No. 08/322,224, Oct. 13, 1994, Pat. No. 5,518,528, and application No. 09/002,278, Dec. 31, 1997.

[60] Provisional application No. 60/046,778, May 16, 1997.

[51] Int. Cl.[7] .............................. B01D 53/22; B01D 53/04
[52] U.S. Cl. ........................ 95/45; 95/90; 95/95; 95/901; 95/902; 96/4; 96/143
[58] Field of Search ........................... 95/90, 95, 46–55, 95/104, 106, 133, 900–903, 45; 96/4, 108, 143, 144, 153

[56] References Cited

U.S. PATENT DOCUMENTS

| | | | |
|---|---|---|---|
| 240,423 | 4/1881 | James .................................. | 206/0.7 X |
| 1,608,155 | 11/1926 | Barnebey ............................ | 206/0.7 X |
| 1,714,245 | 5/1929 | Schaefer .............................. | 96/146 X |
| 2,356,334 | 8/1944 | Maude et al. ...................... | 206/0.7 X |
| 2,450,289 | 9/1948 | Marek ................................. | 96/146 X |
| 2,663,626 | 12/1953 | Spangler ............................. | 206/0.7 X |
| 2,987,139 | 6/1961 | Bush ................................... | 95/133 |
| 2,997,371 | 8/1961 | Wadsworth et al. ............... | 95/131 X |
| 3,006,153 | 10/1961 | Cook ................................... | 206/0.7 X |
| 3,080,307 | 3/1963 | Rinald ................................. | 96/127 X |
| 3,093,564 | 6/1963 | Weisman et al. ................... | 96/127 X |
| 3,116,132 | 12/1963 | Haller et al. ........................ | 95/132 X |
| 3,144,200 | 8/1964 | Taylor et al. ....................... | 96/108 X |
| 3,264,803 | 8/1966 | Read .................................... | 96/146 X |
| 3,287,432 | 11/1966 | Sensel ................................. | 95/95 |
| 3,415,069 | 12/1968 | Hauser ................................ | 96/126 X |

(List continued on next page.)

FOREIGN PATENT DOCUMENTS

| | | | |
|---|---|---|---|
| 1095796 | 12/1960 | Germany ............................ | 95/133 |
| 2264512 | 1/1974 | Germany ............................ | 95/133 |
| 3139-781 | 4/1983 | Germany ............................ | 96/122 |
| 52-72373 | 6/1977 | Japan .................................. | 96/130 |
| 61-133116 | 6/1986 | Japan .................................. | 96/126 |
| 63-88017 | 4/1988 | Japan .................................. | 96/121 |
| 3-127606 | 5/1991 | Japan .................................. | 96/108 |
| 1181692 | 9/1985 | U.S.S.R. ............................. | 95/133 |
| 1544475A1 | 2/1990 | U.S.S.R. ............................. | 95/133 |
| 1583151A1 | 8/1990 | U.S.S.R. ............................. | 95/133 |

OTHER PUBLICATIONS

"Beaded Carbon UPS Solvent Recovery", *Chemical Engineering*, vol. 84, No. 18, pp. 39–40, Aug. 29, 1977 (copy in 96/126).

*Primary Examiner*—Robert Spitzer
*Attorney, Agent, or Firm*—Steven J. Hultquist; Oliver A. M. Zitzmann

[57] ABSTRACT

A sorbent-based gas storage and dispensing system, including a storage and dispensing vessel containing a solid-phase physical sorbent medium having a sorbate gas physically adsorbed thereon. A chemisorbent material is provided in the vessel to chemisorb the impurities for gas phase removal thereof in the storage and dispensing vessel. Desorbed sorbate gas is discharged from the storage and dispensing vessel by a dispensing assembly coupled to the vessel. The chemisorbent may be provided in a capsule including an impurity-permeable, but sorbate gas-impermeable membrane, and installed in the vessel at the time of sorbent material loading. Semiconductor manufacturing processes and products manufactured by such processes are described.

40 Claims, 5 Drawing Sheets

U.S. PATENT DOCUMENTS

| | | | |
|---|---|---|---|
| 3,469,375 | 9/1969 | Barrington et al. | 96/146 X |
| 3,675,392 | 7/1972 | Reighter | 95/96 |
| 3,713,273 | 1/1973 | Coffee | 96/128 X |
| 3,719,026 | 3/1973 | Sand | 95/106 |
| 3,788,036 | 1/1974 | Lee et al. | 96/130 X |
| 4,023,701 | 5/1977 | Dockery | 206/0.7 X |
| 4,263,018 | 4/1981 | McCombs et al. | 96/130 X |
| 4,343,770 | 8/1982 | Simons | 206/0.7 X |
| 4,414,005 | 11/1983 | DeBiévre et al. | 95/127 |
| 4,578,256 | 3/1986 | Nishino et al. | 95/133 X |
| 4,723,967 | 2/1988 | Tom | 96/108 X |
| 4,738,693 | 4/1988 | Tom | 96/108 X |
| 4,738,694 | 4/1988 | Godino et al. | 96/126 X |
| 4,744,221 | 5/1988 | Knollmueller | 62/48 |
| 4,749,384 | 6/1988 | Nowobilski et al. | 96/108 X |
| 4,761,395 | 8/1988 | Tom et al. | 502/401 |
| 4,830,643 | 5/1989 | Sassa et al. | 96/108 |
| 4,881,958 | 11/1989 | Eckardt et al. | 96/127 |
| 5,051,117 | 9/1991 | Prigge et al. | 95/95 |
| 5,089,244 | 2/1992 | Parent et al. | 95/133 X |
| 5,133,787 | 7/1992 | Diot et al. | 96/121 |
| 5,151,395 | 9/1992 | Tom | 502/67 |
| 5,202,096 | 4/1993 | Jain | 96/126 X |
| 5,238,469 | 8/1993 | Briesacher et al. | 96/126 X |
| 5,385,689 | 1/1995 | Tom et al. | 252/194 |
| 5,409,526 | 4/1995 | Dao-Hong Zheng et al. | 96/132 |
| 5,417,742 | 5/1995 | Tamhankar et al. | 95/96 |
| 5,518,528 | 5/1996 | Tom et al. | 95/103 |
| 5,704,965 | 1/1998 | Tom et al. | 95/95 |
| 5,704,967 | 1/1998 | Tom et al. | 96/143 |
| 5,707,424 | 1/1998 | Tom et al. | 96/143 X |
| 5,761,910 | 6/1998 | Tom | 96/108 X |
| 5,800,596 | 9/1998 | Collin et al. | 96/108 X |

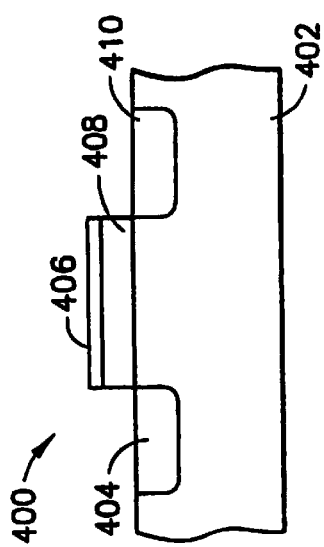
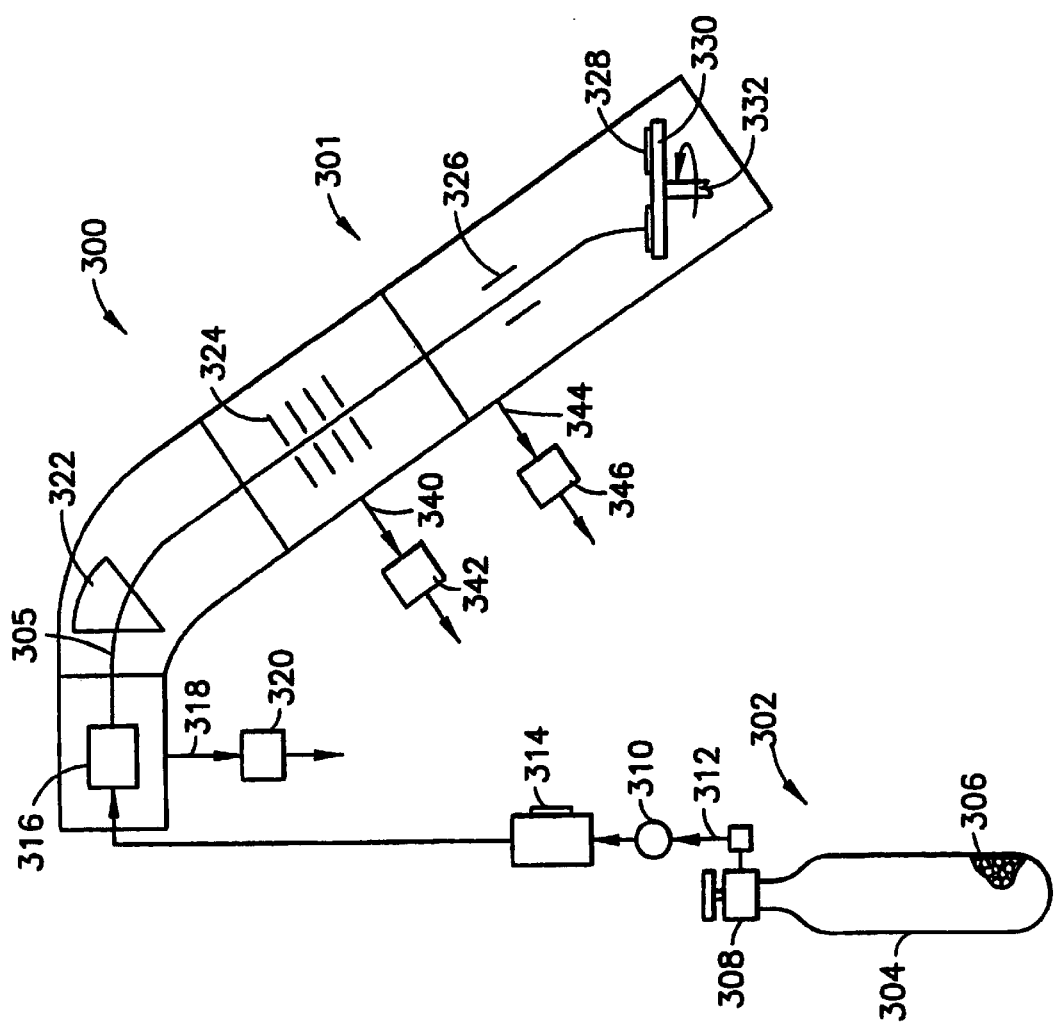

SORBENT-BASED GAS STORAGE AND DELIVERY SYSTEM FOR DISPENSING OF HIGH-PURITY GAS, AND APPARATUS AND PROCESS FOR MANUFACTURING SEMICONDUCTOR DEVICES, PRODUCTS AND PRECURSOR STRUCTURES UTILIZING SAME

CROSS-REFERENCE TO RELATED APPLICATIONS

This is a continuation-in-part of (i) U.S. patent application Ser. No. 08/809,019 filed Apr. 11, 1997, now U.S. Pat. No. 5,935,305, in the United States Patent and Trademark Office as a Designated/Elected Office (DO/EO/US) under the provisions of 35 USC 371, based on PCT international application no. PCT/US95/13040 filed on Oct. 13, 1995 designating the United States as a Designated State, and claiming the priority of U.S. patent application Ser. No. 322,224 filed Oct. 13, 1994, and (ii) U.S. patent application Ser. No. 09/002,278 filed Dec. 31, 1997 claiming the priority of U.S. Provisional Patent Application Ser. No. 60/046,778 filed May 16,1997. U.S. patent application Ser. No. 08/809,019 filed Apr. 11, 1997 is also a continuation-in-part of U.S. patent application Ser. No. 08/322,224 filed Oct. 13, 1994, and issued May 21, 1996 as U.S. Pat. No. 5,518,528.

BACKGROUND OF THE INVENTION

1. Field of the Invention

This invention relates generally to storage and dispensing systems for the selective dispensing of a gas from a storage and dispensing vessel containing a physical sorbent medium, on which the gas has been sorbed, and from which the gas is desorbed in the dispensing operation. The invention further relates to semiconductor manufacturing systems and processes utilizing such storage and dispensing systems for reagent delivery, to electronic device structures obtained by such semiconductor manufacturing processes, and to end use products including such electronic device structures.

2. Description of the Related Art

In a wide variety of industrial processes and applications, there is a need for a reliable source of process fluid(s) which is compact, portable, and available to supply the process fluid(s) on demand. Such industrial processes and applications include semiconductor manufacturing, ion implantation, manufacture of flat panel displays, medical treatment, water treatment, emergency breathing equipment, welding operations, space-based applications involving delivery of liquids and gases, etc. The aforementioned needs are particularly acute in the semiconductor manufacturing industry, due to progressively increasing electronic device integration densities and increasing wafer sizes, which demands a high level of process reliability and efficiency.

U.S. Pat. No. 4,744,221 issued May 17, 1988 to Karl O. Knollmueller discloses a method of storing and subsequently delivering arsine. In the disclosed method of this patent, arsine is contacted at a temperature of from about −30° C. to about +30° C. with a zeolite of pore size in the range of from about 5 to about 15 Angstroms to adsorb arsine on the zeolite. The arsine is subsequently dispensed by heating the zeolite to an elevated temperature of up to about 175° C. for sufficient time to release the arsine from the zeolite material.

The method disclosed in the Knollmueller patent is disadvantageous in that it requires the provision of heating means for the zeolite material, which must be constructed and arranged to heat the zeolite to sufficient temperature to desorb the previously sorbed arsine from the zeolite in the desired quantity.

The use of a heating jacket or other means exterior to the vessel holding the arsine-bearing zeolite is problematic in that the vessel typically has a significant heat capacity, and therefore introduces a significant lag time to the dispensing operation. Further, heating of arsine causes it to decompose, resulting in the formation of hydrogen gas, which introduces an explosive hazard into the process system. Additionally, such thermally-mediated decomposition of arsine effects substantial increase in gas pressure in the process system, which may be extremely disadvantageous from the standpoint of system life and operating efficiency.

The provision of interiorly disposed heating coil or other heating elements in the zeolite bed itself is problematic since it is difficult with such means to uniformly heat the zeolite bed to achieve the desired uniformity of arsine gas release.

The use of heated carrier gas streams passed through the bed of zeolite in its containment vessel may overcome the foregoing deficiencies, but the temperatures necessary to achieve the heated carrier gas desorption of arsine may be undesirably high or otherwise unsuitable for the end use of the arsine gas, so that cooling or other treatment is required to condition the dispensed gas for ultimate use.

U.S. Pat. No. 5,518,528 issued May 21, 1996 in the names of Glenn M. Tom and James V. McManus, describes a gas storage and dispensing system, for the storage and dispensing of gases, e.g., hydride gases, halide gases, organometallic Group V compounds, etc. which overcomes various disadvantages of the gas supply process disclosed in the Knollmueller patent.

The gas storage and dispensing system of the Tom et al. patent comprises an adsorption-desorption apparatus, for storage and dispensing of gases, including a storage and dispensing vessel holding a solid-phase physical sorbent, and arranged for selectively flowing gas into and out of the vessel. A sorbate gas is physically adsorbed on the sorbent. A dispensing assembly is coupled in gas flow communication with the storage and dispensing vessel, and provides, exteriorly of the vessel, a pressure below the vessel's interior pressure, to effect desorption of sorbate from the solid-phase physical sorbent medium, and flow of desorbed gas through the dispensing assembly. Heating means may be employed to augment the desorption process, but as mentioned above, heating entails various disadvantages for the sorption/desorption system, and it therefore is preferred to operate the Tom et al. system with the desorption being carried out at least partially by pressure differential-mediated release of the sorbate gas from the sorbent medium.

The storage and dispensing vessel of the Tom et al. patent embodies a substantial advance in the art, relative to the prior art use of high pressure gas cylinders, as for example are conventionally employed in the semiconductor manufacturing industry to provide process gases. Conventional high pressure gas cylinders are susceptible to leakage from damaged or malfunctioning regulator assemblies, as well as to rupture and unwanted bulk release of gas from the cylinder if the internal gas pressure in the cylinder exceeds permissible limits. Such overpressure may for example derive from internal decomposition of the gas leading to rapidly increasing interior gas pressure in the cylinder.

The gas storage and dispensing system of the Tom et al. patent thus reduces the pressure of stored sorbate gases by providing a vessel in which the gas is reversibly adsorbed onto a carrier sorbent, e.g., a zeolite, activated carbon and/or other adsorbent material. Considering now the manufacture of semiconductors in greater detail, many processes used in semiconductor manufacture utilize hazardous materials, e.g., toxic, flammable or pyrophoric, in the vapor state. The safety of the manufacturing process in various instances could be significantly improved by replacing the currently used gas sources. In particular, hexamethyldisilazane (HMDS) and chlorotrimethylsilane (CITMS) are used as primers to increase the adhesion of photoresists to wafers. HMDS and CITMS can be spun on the wafer but are typically applied either as a spray or a vapor. Photoresist developers and strippers are normally used as liquids but can also be used as vapors; these materials are acids or bases (organic or inorganic) and can have aromatic functionality. The safety of use of all these materials could be improved from their current mode of supply and usage in the semiconductor manufacturing facility.

In general, the manufacture of semiconductors requires very low contamination levels. Typical manufacturing facilities yield completed wafers with defect densities of a few tenths/cm$^2$. Maintaining the cleanliness of the tooling is essential to realizing a process flow at competitive costs. In-situ chamber cleans are now routine for most process tools. Many of the gases or high vapor pressure liquids used in these cleans are hazardous, exhibiting one or more of the following properties: toxicity, flammability, pyrophoricity and/or adverse impact on the ozone layer (by so-called global warming gases). The safety of the cleaning processes could be significantly improved by replacing the gas sources currently employed.

In addition to the aforementioned cleaning reagents, many other process gases used in the manufacture of semiconductors are hazardous and exhibit one or more of the following properties: toxicity, flammability or pyrophoricity. In particular, chemical vapor deposition processes (CVD) are carried out with gaseous or liquid feed stocks which in many instances are associated with significant health and safety issues. Such gases are essential to create the individual layers making up the semiconductor structure, but the safety of the manufacturing process could be significantly improved by replacing the fluid sources utilized in current conventional semiconductor manufacturing practice.

A serious problem with storage and dispensing systems of the general type described in U.S. Pat. No. 5,518,528 is decomposition of the stored gas, such as hydride gas species. The '528 patent attempts to minimize the problems associated with generation of decomposition products of the stored gas, by utilizing sorbent materials containing very low levels of the trace materials which can catalyze or mediate decomposition reactions such as the degradation of arsine to form hydrogen gas. Hydrogen gas is flammable and has an associated safety risk, as well as increasing the pressure of the stored gas beyond desired levels (of atmospheric or near-atmospheric pressure).

Since variation in sorbent material may occur as a result of manufacturing, storage conditions, etc., and since in some instances it may be desirable to utilize more economic grades of sorbent material, it would be desirable to provide a gas storage and dispensing system which has such flexibility, without the deleterious effects incident to gas decomposition.

It therefore is an object of the present invention to provide a gas storage and dispensing system, and associated semiconductor manufacturing apparatus, systems and methodology which overcome the various aforementioned deficiencies of the art.

Other objects and advantages of the invention will be more fully apparent from the ensuing disclosure and appended claims.

SUMMARY OF THE INVENTION

The present invention contemplates an adsorption-desorption apparatus and method, for storage and dispensing of a gas, e.g., hydride gases, halide gases, organometallic Group V compounds, etc.

In an apparatus aspect, the invention comprises:

a storage and dispensing vessel containing a solid-phase physical sorbent medium having a sorbate gas physically adsorbed thereon;

a chemisorbent material in the storage and dispensing vessel, having chemisorptive affinity for impurities to the sorbate gas, and arranged to chemisorb said impurities for gas phase removal thereof in the storage and dispensing vessel;

a dispensing assembly coupled in gas flow communication with the storage and dispensing vessel, for selectively discharging desorbed sorbate gas from the storage and dispensing vessel.

The impurities in the foregoing system may for example comprise trace components such as water, metals, and oxidic transition metal species (e.g., oxides, sulfites and/or nitrates) that if not chemisorbed for removal thereof in the gas storage and dispensing vessel, would decompose the sorbate gas in the storage and dispensing vessel. The chemisorbent may, alternatively or additionally, be chemisorbent in relation to the decomposition products themselves.

Although generally preferred to operate solely by pressure differential, in respect of the sorption and desorption of the gas to be subsequently dispensed, the system of the invention may in some instances advantageously employ a heater operatively arranged in relation to the storage and dispensing vessel for selective heating of the solid-phase physical sorbent medium, to effect thermally-enhanced desorption of the sorbate gas from the solid-phase physical sorbent medium.

A preferred solid-phase physical sorbent medium comprises a crystalline aluminosilicate composition, e.g., with a pore size in the range of from about 4 to about 13 Å, although crystalline aluminosilicate compositions having larger pores, e.g., so-called mesopore compositions with a pore size in the range of from about 20 to about 40 Å are also potentially usefully employed in the broad practice of the invention. Examples of such crystalline aluminosilicate compositions include 5A molecular sieve, and preferably a binderless molecular sieve. Although molecular sieve materials such as crystalline aluminosilicates and carbon molecular sieves are preferred in many instances, the solid-phase physical sorbent medium may usefully comprise other materials such as silica, alumina, macroreticulate polymers, kieselguhr, carbon, etc. The sorbent materials may be suitably processed or treated to ensure that they are devoid of trace components which deleteriously affect the performance of the gas storage and dispensing system. For example, carbon sorbents may be subjected to washing treatment, e.g., with hydrofluoric acid, to render them sufficiently free of trace components such as metals and oxidic transition metal species. Potentially useful carbon materials include so-called bead activated carbon of highly uniform spherical particle shape, e.g., BAC-MP, BAC-LP, and BAC-G-70R, available from Kureha Corporation of America, New York, N.Y.

Examples of potentially suitable chemisorbent materials include finely divided Group II metals, such as barium, strontium, calcium, magnesium, etc.

Alternatively, the chemisorbent may comprise a scavenger for such impurities including one or more of the following:

(A) scavengers including a support having associated therewith, but not covalently bonded thereto, a compound which in the presence of such contaminant provides an anion which is reactive to effect the removal of such contaminant, such compound being selected from one or more members of the group consisting of:
  (i) carbanion source compounds whose corresponding protonated carbanion compounds have a $pK_a$ value of from about 22 to about 36; and
  (ii) anion source compounds formed by reaction of the carbanion source compounds with the sorbate gas; and (B) scavengers comprising:
  (i) an inert support having a surface area in the range of from about 50 to about 1000 square meters per gram, and thermally stable up to at least about 250° C.; and
  (ii) an active scavenging species, present on the support at a concentration of from about 0.01 to about 1.0 moles per liter of support, and formed by the deposition on the support of a
    Group IA metal selected from sodium, potassium, rubidium, and cesium and their mixtures and alloys and pyrolysis thereof on said support.

By way of an example, such chemisorbent material may advantageously comprise a scavenger component selected from the group consisting of: trityllithium and potassium arsenide.

In respect of such chemisorbent materials for contaminants of the sorbate gas to be dispensed, any of a wide variety of scavengers or chemisorbent materials may be employed, including scavenger compositions of the types disclosed and claimed in U.S. Pat. No. 4,761,395 issued Aug. 2, 1988 to Glenn M. Tom, et al.

The chemisorbent material when employed may be utilized as a separate bed in gas communication with the bed of physical adsorbent, or alternatively the chemisorbent may be dispersed randomly or selectively throughout a bed of physical adsorbent material in the storage and dispensing vessel.

The invention in another aspect relates to a semiconductor manufacturing facility including a semiconductor manufacturing apparatus utilizing a gas reagent, e.g., an ion implantation unit, and a gas reagent source therefor that is coupled in gas flow communication with such semiconductor manufacturing apparatus, wherein the gas reagent source comprises a gas storage and dispensing system that is of a general type as described hereinabove.

The present invention relates in still another aspect to a process for supplying a reagent gas, comprising:
  providing a storage and dispensing vessel containing a solid-phase physical sorbent medium having the reagent gas physically adsorbed thereon;
  chemisorbing gas phase impurities of the reagent gas in the storage and dispensing vessel for gas phase removal thereof;
  desorbing reagent gas from the physical sorbent medium; and
  discharging the desorbed reagent gas from the storage and dispensing vessel.

The present invention relates in another aspect to an apparatus and process for the fabrication of semiconductor or other electronic device structures and for producing end use products comprising same. The invention in such aspect utilizes a storage and dispensing system which is arranged to supply fluid for processing operations in the fabrication of such device structures.

In one aspect, the invention relates to a process for fabricating an electronic device structure on or in a substrate, comprising:
  providing a storage and dispensing vessel containing a physical sorbent medium having physically adsorbed thereon a fluid for fabrication of the electronic device structure, such as a source fluid for a material constituent of the electronic device structure, or alternatively a reagent, e.g., an etchant, cleaning agent or mask material, which is utilized in the fabrication of the electronic device structure, but which does not compose or form a material constituent of the electronic device structure;
  desorbing the fluid from the physical sorbent medium and dispensing the fluid from the storage and dispensing vessel; and
  contacting the substrate with the dispensed fluid from the storage and dispensing vessel, under conditions effective to utilize the fluid or a constituent thereof on or in the substrate,
  wherein the storage and dispensing vessel optionally further contains a chemisorbent for impurities of the fluid, whereby the fluid is able to be dispensed in a high purity condition.

In the process of the invention, the contacting step may include a process step such as for example:
  (a) ion implantation;
  (b) epitaxial growth;
  (c) plasma etching;
  (d) reactive ion etching;
  (e) metallization;
  (f) physical vapor deposition;
  (g) chemical vapor deposition;
  (h) photolithography;
  (i) cleaning; or
  (j) doping.

In a preferred aspect, the present invention relates to a process for fabricating an electronic device structure on or in a substrate, comprising:
  providing a storage and dispensing vessel containing a physical sorbent medium having physically adsorbed thereon a source fluid for a material constituent of the electronic device structure;
  desorbing source fluid from the physical sorbent medium and dispensing source fluid from the storage and dispensing vessel; and
  contacting the substrate with dispensed source fluid from the storage and dispensing vessel, under conditions effective to deposit the material constituent on or in the substrate,
  optionally with chemisorbing of impurities present in the vessel which otherwise would reduce the purity of the dispensed fluid.

As used herein, the term "constituent" in reference to the fluid stored in and dispensed from the storage and dispensing vessel of the invention is intended to be broadly construed to encompass any components of the dispensed fluid, as well as the products thereof, e.g., reaction or decomposition products. The fluid may therefore comprise an organometallic reagent or other precursor yielding a metal or other material constituent for deposition on or in the substrate, e.g., by process steps such as chemical vapor deposition, ion implantation, etc.

The term "substrate" is also intended to be broadly construed to include all physical structures for the electronic device structure, including wafers, wafer bases, supports, base structures, etc. as well as physical structures for the electronic device structure, which are already partially formed, treated or processed, or which are precursor structures for the foregoing. Thus, the substrate may for example be a wafer per se. Alternatively, the substrate may for example be a partially fabricated device assembly which is being contacted with the dispensed process fluid(s) in further manufacturing operation(s).

The term "high purity condition" means that the chemisorbable impurities in the fluid that is stored in and dispensed from the storage and dispensing vessel are at insubstantial levels for the end use application in which such fluid is used. By way of example, in semiconductor manufacturing applications, it may be necessary for such impurities, such as water, oxygen, and transition metals, to be less than 100 ppm by weight.

In general, a wide variety of gases may be dispensed from the storage and dispensing vessel, for use in manufacturing operations, such as for example photolithography steps in the manufacture of VLSI and ULSI circuits, epitaxial deposition of film materials such as silicon from dispensed Si source gases, ion implantation and doping in the fabrication of CMOS, NMOS, BiCMOS and other structures, and manufacture of devices such as DRAMs, SRAMs, FeRAMs, etc.

The process of the invention may be employed to fabricate electronic device structures such as for example:

(a) transistors;
(b) capacitors;
(c) resistors;
(d) memory cells;
(e) dielectric material;
(f) buried doped substrate regions;
(g) metallization layers;
(h) channel stop layers;
(i) source layers;
(j) gate layers;
(k) drain layers;
(l) oxide layers;
(m) field emitter elements;
(n) passivation layers;
(o) interconnects;
(p) polycides;
(q) electrodes;
(r) trench structures;
(s) ion implanted material layers;
(t) via plugs;
(u) precursor structures for the foregoing (a)–(t) electronic device structures; and
(v) device assemblies comprising more than one of the foregoing (a)–(t) electronic device structures.

As a further specific example, the electronic device structures fabricated by the process of the invention may comprise memory chip devices, such as:

(i) ROM chips;
(ii) RAM chips;
(iii) SRAM chips;
(iv) DRAM chips;
(v) PROM chips;
(vi) EPROM chips;
(vii) EEPROM chips; and
(viii) flash memory chips.

In one preferred embodiment of the invention, the microelectronic device structure comprises a semiconductor logic chip (e.g., a microcontroller or microprocessor).

In another preferred embodiment, the contacting step comprises ion implantation. In yet another preferred embodiment, the contacting step comprises chemical vapor deposition, e.g., of polysilicon, using a silicon precursor such as silane or disilane, and in which the polysilicon may be doped with dopant species such as boron, phosphorus, arsine, etc.

In ion implantation, chemical vapor deposition and other semiconductor device fabrication processes of the invention, the fluid source for the semiconductor manufacturing step may include a metalorganic composition whose metal moiety is selected from the group consisting of aluminum, barium, strontium, calcium, niobium, tantalum, copper, platinum, palladium, iridium, rhodium, gold, tungsten, titanium, nickel, chromium, molybdenum, vanadium, and combinations of the foregoing.

As used herein, the term "electronic device structure" refers to a microelectronic device, a precursor structure for such a device, or a component structural part or subassembly for such a device. A precursor structure may for example comprise a substrate or wafer element for the device which has been treated to form a layer or element thereon or therein, such as a capacitor trench, a buried doped region, a passivated surface, etched wells for emitter tip formation, a barrier layer or interlayer on a wafer base, an integrated circuit ready for ceramic encapsulation, or any other structural article constituting less than the complete device ultimately desired as the end-use product.

It will be appreciated that an electronic device structure that is formed in one processing step of a multi-step process according to the present invention may, upon completion of that processing step, then become the substrate structure for the next succeeding processing step in the overall multi-step process.

In another aspect of the invention, a process is utilized for fabricating an electronic product including an electronic device structure, wherein the electronic device structure is fabricated with deposition of material on or in a substrate from a source fluid therefor, including the steps of:

providing said fluid in a vessel in which the fluid is sorptively retained by a physical sorbent medium;

desorbing said fluid from the physical sorbent medium as needed during the fabrication process and dispensing same from the vessel containing the physical sorbent medium; and contacting the dispensed fluid with the substrate to deposit said material on or in the substrate, and optionally chemisorbing impurities of the fluid in the vessel, whereby the fluid is dispensed substantially free of such impurities.

The product of the above-mentioned process may be a product such as a computer, personal digital assistant, telephone, flat panel display, monitor, sound system, electronic game, virtual reality device or smart consumer appliance. Smart consumer appliances may for example be appliances such as cooking appliances, refrigerators, freezers, dishwashers, clothes washing machines, clothes dryers, humidifiers, dehumidifiers, air conditioners, global positioning devices, lighting systems, and remote controllers for the foregoing.

Other aspects, features and embodiments of the invention will be more fully apparent from the ensuing disclosure and appended claims.

BRIEF DESCRIPTION OF THE DRAWINGS

FIG. 5 is a schematic representation of an ion implant process system including a storage and dispensing vessel containing gas which is supplied for ion implantation doping of a substrate in the illustrated ion implant chamber.

FIG. 6 is a schematic cross-sectional elevation view of an NMOS transistor structure which is formed in the process system shown in FIG. 3, comprising n-doped source and drain regions.

DETAILED DESCRIPTION OF THE INVENTION, AND PREFERRED MODES OF CARRYING OUT SAME

The disclosures of the following U.S. patents and patent applications are hereby incorporated herein by reference in their entirety: U.S. Pat. No. 5,518,528 issued May 21, 1996; U.S. Pat. No. 5,704,965 issued Jan. 6, 1998; U.S. Pat. No. 5,704,967 issued Jan. 6, 1998; U.S. Pat. No. 5,707,424 issued Jan. 13, 1998; U.S. patent application Ser. No. 08/809,019 filed Apr. 11, 1997; and U.S. patent application Ser. No. 08/859,172 filed May 20, 1997; and U.S. patent application Ser. No. 09/002,278 filed Dec. 31, 1997.

Figure 1:
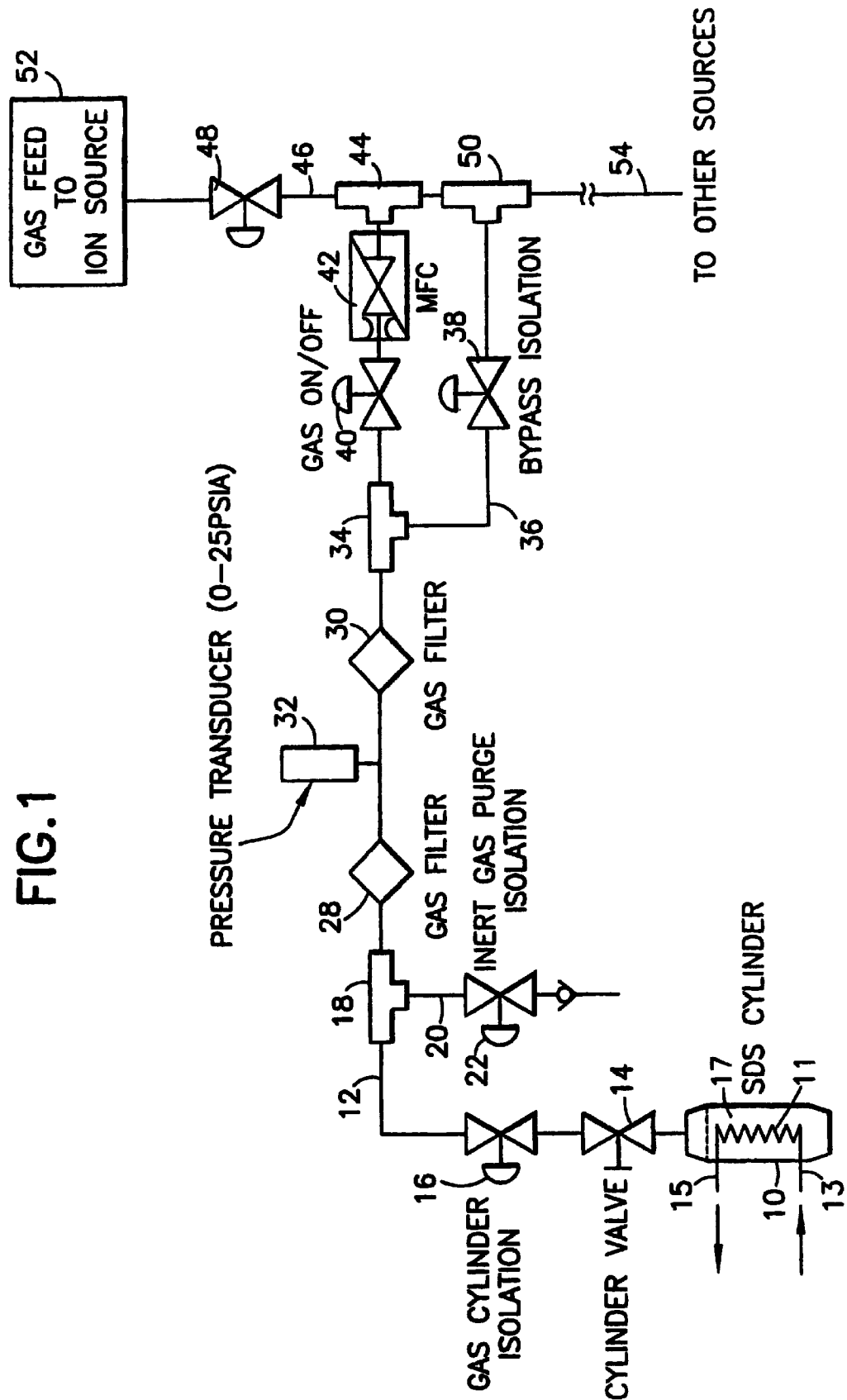
FIG. 1 is a schematic representation of a storage and delivery system according to one embodiment of the invention.

Referring now to the drawings, FIG. 1 is a schematic representation of a storage and delivery system according to one embodiment of the invention.

In the schematic storage and delivery system shown in FIG. 1, a gas storage cylinder 10 is provided which may be filled with a bed 17 of suitable physical adsorbent material, e.g., a bead activated carbon physical adsorbent medium or other suitable sorbent material having sorptive affinity for the gas to be stored in and subsequently dispensed from the cylinder 10.

The sorbent material may be in any suitable form, as for example granules, powder, pellets, matrix structures, or any other suitable shapes or forms. Preferably the sorbent material is in a finely divided form, and is characterized by a high surface area, to maximize its effectiveness and capacity for holding the fluid to be stored and subsequently dispensed.

In the gas cylinder 10 containing the bed 17 of sorbent material, the sorbent material has physically adsorbed gas component(s), such as arsine or phosphine, adsorbed on its surfaces (including pore interior surfaces as well as exterior surfaces of the sorbent media).

The gas cylinder may be of any suitable size and shape, and may be formed of any suitable material(s) of construction. Preferably the cylinder is formed of a metal material of construction, and is sized to have an interior volume of from about 0.25 to about 40 liters, so that the storage and dispensing vessel is manually transportable in character.

The cylinder 10 is connected to a manifold 12, having disposed therein a cylinder valve 14 for controllably releasing gas from cylinder 10, upstream of a gas cylinder isolation valve 16, which may be selectively actuated to close cylinder 10 to communication with the manifold 12.

The manifold has a branch fitting 18 therein, by means of which the manifold 12 is coupled in gas flow communication with a branch purge line 20 having inert gas purge isolation valve 22 therein, whereby the manifold may be purged with inert gas, prior to active operation delivery of gas from cylinder 10.

Downstream from the fitting 18, the manifold contains two successive gas filters 28 and 30, intermediate of which is disposed a pressure transducer 32 which may, for example, have a pressure operating range of from about 0 to about 25 psia.

The manifold 12 is connected downstream of gas filter 30 with a branch fitting 34 to which is coupled a bypass conduit 36 having bypass isolation valve 38 therein. The manifold 12 downstream of fitting 34 has a gas flow on-off valve 40 therein, downstream of which is disposed a mass flow controller 42 for controllably adjusting the flow rate of the hydride or halite gas dispensed through manifold 12. At its terminus downstream of mass flow controller 42, the manifold 12 is connected by coupling fitting 44 to dispensing line 46 filing flow control valve 48 therein, and also being coupled in gas flow communication with bypass line 36 via coupling fitting 50. The discharge line 46 is as shown joined to an ion source generating means, schematically shown as element 52. The other end 54 of discharge line 46 may be suitably coupled in gas flow communication with another gas dispensing means, as desirable or necessary in a given end use application of the FIG. 1 storage and delivery system apparatus.

The ion source generating means may be part of a semiconductor manufacturing facility in which the gas dispensed by the storage and dispensing system is utilized in the facility in the manufacture of semiconductor materials, semiconductor devices and semiconductor precursor structures, and products containing same, as hereinafter more fully discussed.

Shown as an optional feature of the storage and dispensing vessel 10 in the FIG. 1 embodiment is a heat exchange passage 11 which extends vertically upwardly through the bed 17 of sorbent material. The heat exchange passage is joined at its respective lower and upper ends to heat exchange fluid feed inlet line 13 and heat exchange fluid effluent discharge line 15.

The heat exchange fluid feed inlet line 13 may in turn be joined to a suitable source of heat exchange fluid (not shown) which may be operatively associated with a burner, resistance heater, or other heating means serving to selectively heat the bed 17 of sorbent material when it is desired to dispense fluid from the vessel 10.

Thermal desorption thus may be effected by passage of a suitable heat exchange fluid through the feed inlet line 13, the heat exchange passage 11, and the fluid effluent discharge line 15, for recirculation (e.g., by pump and reservoir means, not shown) through the heat exchange circuit. Such heating means thereby function to heat the sorbent medium in the bed 17 to sufficient elevated temperature for thermally-assisted desorption to take place.

By the arrangement schematically shown in FIG. 1, thermally assisted desorption and dispensing of the sorbate fluid may be carried out alternative to, or in combination with, pressure differential-mediated dispensing of the sorbate fluid, with the choice of the specific desorption modality being readily selected and/or determinable without undue experimentation by those skilled in the art.

In the manufacture of the storage and dispensing system of the invention, the storage and dispensing vessel is cleaned, if required, to ensure the absence of any contaminants or species therein, including out-gassable species in the walls of the vessel, which may adversely impact the storage and dispensing operation subsequently carried out with the vessel. For this purpose, it may be desirable to bake out, solvent degrease, or otherwise subject the vessel and its interior surfaces to cleaning, removal or treatment steps, to provide an appropriately clean container for the subsequently installed sorbent material.

The sorbent material then is loaded into the interior volume of the storage and dispensing vessel, and the vessel is final assembled and sealed. The sorbent material may be cleaned or processed prior to its introduction to the vessel, so that the sorptive capacity of the sorbent medium is maximized. Additionally, or alternatively, the sorbent medium may be cleaned or processed in situ, to ensure maximum sorptive capacity, e.g., by bake-out of the vessel containing the sorbent, at sufficient elevated temperature and for sufficient time to desorb and clean the sorbent material of extraneous sorbate species. For example, the vessel may be evacuated (degassed) for an extended period of time, e.g., 48 hours, at a suitable elevated temperature, e.g., 200–400° C., using an appropriate vacuum pump or other evacuation means. After evacuation, the vessel is allowed to cool to room temperature over a suitable period of time, e.g., ~6–12 hours.

After the evacuation/degas procedure, the evacuated carbon sorbent container is connected to a sorbate fluid fill manifold. It will be recognized that the sorption of fluid species may involve significant exotherm due to heat of adsorption effects, and therefore it is desirable to maintain the vessel and sorbent material at suitable temperature so that the sorbate fluid is not desorbed by such heat effects after its initial take-up by the sorbent material.

In order to maintain an approximate isothermal condition, the cylinder may for example be immersed in a thermal ballast liquid, such as for example an aqueous ethylene glycol mixture maintained at a constant temperature of 25° C.

The sorbate fluid fill manifold may be evacuated prior to sorbate fluid dispensing to appropriately low pressure, e.g., to less than $10^{-3}$ Torr, to remove non-condensable gases that may be present in the flow passages of the fill manifold. After such evacuation, the sorbent-containing vessel may be filled with the sorbate fluid at a suitable rate until the desired pressure level is reached. For purposes of efficiency, it may be desirable to monitor the pressure of the vessel during the fill operation with a suitable pressure monitor or other (e.g., transducer-based) sensing means.

During the filling process, the temperature of the vessel and the thermal ballast tank may be independently monitored, along with the sorbate fluid temperature, for process control purposes. Pressure is monitored to determine the endpoint of the fill process.

It may be desirable to fill the vessel with the sorbate fluid in stages, and to allow equilibration of the system so that the temperature effects are at least partially dissipated to the ambient environment or to a heat transfer medium such as the thermal ballast liquid described hereinabove.

Alternatively, it may be suitable to fill the vessel to a specified pressure, and then allow the vessel to cool to a final temperature and pressure condition of the sorbent bed and associated vessel.

Thus, dose filling or continuous filling of the sorbate fluid may be carried out, to introduce the sorbate fluid into the vessel for sorptive take-up by the sorbent material therein. Following the fill sequence, the vessel, after its disengagement from the fill manifold, may be shipped, stored, or arranged for subsequent dispensing use by attachment to piping, coupling, and dispensing circuitry at the dispensing site.

The sorbent material in cylinder 10 in the FIG. 1 system may suitably have associated therewith in the cylinder interior volume a quantity of a suitable chemisorbent material. Such chemisorbent material may as mentioned comprise a finely divided Group II metal, such as barium, strontium, calcium, magnesium, etc., as for example in a powder form presenting a high surface area for reaction with impurity species in the interior volume of the storage and dispensing vessel. Such impurity species may for example comprise water, oxygen, nitrogen, air, hydrogen, transition metal oxides, etc. which may derive from the sorbent material introduced initially into the storage and dispensing vessel, or from outgassing from the interior wall surfaces of the storage and dispensing vessel, or from atmospheric (ambient gas) inleakage.

In materials such as semiconductor manufacturing, it is essential that the dispensed gas have suitable purity characteristics, otherwise the impurity species present in the dispensed gas may deleteriously affect the semiconductor product, rendering it unsatisfactory, or even wholly unsuitable, for its intended purpose.

The invention therefore contemplates the inclusion in the interior volume of the storage and dispensing vessel of a suitable chemisorbent material which will chemically react with such impurity gas species and cause them to be removed from the gas phase in the vessel so that the subsequently dispensed gas is of high purity characteristics and at least partially reduced in the concentration of the impurity species. Because the chemisorption reaction produces as reaction products solid-phase species having no appreciable vapor pressure, the gas dispensed from the storage and dispensing vessel may be usefully employed without ancillary or downstream purification such as may otherwise be required in the absence of the chemisorbent material of the invention being disposed in the vessel.

As an alternative to the aforementioned Group II metals as getter or chemisorbent components in the interior volume of the storage and dispensing vessel for reactively removing such gas phase impurities, the chemisorbent utilized in the vessel may comprise any other suitable chemisorbent species, such as for example a scavenger for such gas phase impurities including one or more of the following:

(A) scavengers including a support having associated therewith, but not covalently bonded thereto, a compound which in the presence of such contaminant provides an anion which is reactive to effect the removal of such contaminant, such compound being selected from one or more members of the group consisting of:
(i) carbanion source compounds whose corresponding protonated carbanion compounds have a $pK_a$ value of from about 22 to about 36; and
(ii) anion source compounds formed by reaction of the carbanion source compounds with the sorbate gas; and (B) scavengers comprising:
(i) an inert support having a surface area in the range of from about 50 to about 1000 square meters per gram, and thermally stable up to at least about 250° C.; and
(ii) an active scavenging species, present on the support at a concentration of from about 0.01 to about 1.0 moles per liter of support, and formed by the deposition on the support of a Group IA metal selected from sodium, potassium, rubidium, and cesium and their mixtures and alloys and pyrolysis thereof on said support.

As a further example, such chemisorbent material may advantageously comprise a scavenger component selected from the group consisting of: trityllithium and potassium arsenide.

It is within the contemplation of the present invention to utilize multiple chemisorbent species in the storage and dispensing vessel. Further, it is within the contemplation of the invention to deploy the chemisorbent material on a support or applied in the interior volume of the vessel on interior surfaces thereof, e.g., as a sputtered or sprayed film or coating on the interior walls of the vessel.

In some instances, the chemisorbent desirably employed to reactively remove the impurity species in the vessel will also be reactive with the gas which is to be stored and subsequently dispensed. In such instances, it is necessary to isolate or segregate the chemisorbent from the physical sorbent having the gas sorbed thereon, so that the gas held in inventory on the sorbent material is protected from contact with the chemisorbent and only the impurity species are allowed to contact the chemisorbent.

For such purpose, the chemisorbent may be isolated or shielded from the sorbate gas to be dispensed, by being placed in the vessel in an isolation structure containing the chemisorbent, in which the isolation structure includes a membrane or other physical barrier which is permeable to the impurity species but is impermeable to the sorbate to be held on the sorbent material for subsequent discharge as the product gas from the storage and dispensing vessel.

The chemisorbent may therefore be provided in a capsule or other container which is physically reposed in the interior volume and which is permeable only to the impurity gas species.

For example, the container or restricted area of the interior volume of the vessel may have a permselective membrane shielding the chemisorbent and only permeable to the impurity species.

The membrane may be formed of a wide variety of potentially useful materials, including, for example, polypropylene, polyvinylidene fluoride, polytetrafluoroethylene, polyfluoroacetate, silicone, surface-treated glass fabrics, and Noryl® polyphenylene oxide film (General Electric Company, Pittsfield, Mass.).

By such arrangement, the present invention enables high purity gas dispensing of gas from a sorbent-based gas storage and dispensing system, even with use of inferior grades of sorbent, or even in the presence (in the sorbent vessel) of trace impurities that would otherwise mediate decomposition of the sorbate gas.

The sorbate gas may for example comprise a gas such as a hydride and/or a halide gas, and/or an organometallic Group V compound, e.g., arsine, phosphine, chlorine, $NF_3$, $BF_3$, $BCl_3$, diborane ($B_2H_6$ or its deuterium analog, $B_2D_6$), HCl, HBr, HF, HI, tungsten hexafluoride, or $(CH_3)_3Sb$, tungsten hexafluoride, hydrogen fluoride, hydrogen chloride, hydrogen iodide, hydrogen bromide, germane, ammonia, stibine, hydrogen sulfide, hydrogen selenide, hydrogen telluride, bromine, iodine, fluorine, etc.

Gas flow from the storage and delivery system may be established using an existing pressure differential between the storage and delivery system and a low pressure downstream process, e.g., an ion implant vacuum chamber. Utilizing a device such as a mass flow controller, a constant flow can be achieved as the sorbent container pressure decreases.

With only low level heating of the sorbent material in the practice of the present invention, by so-called thermally assisted delivery, it is possible to augment the delivery rate of the desorbing gas, so that flow rates of up to 500 sccm and higher are readily achievable. Nonetheless, high rates of gas delivery are achievable in the broad practice of the present invention with adiabatic operation (no supplemental input of heat or thermal energy to the sorbate-laden sorbent medium), solely by the pressure differential existing between the sorbent vessel and the reduced pressure of the semiconductor (or other industrial or manufacturing) process, such as ion implantation, molecular beam epitaxy, and chemical vapor deposition.

The apparatus of the present invention may be readily provided in a unitary apparatus form, as disposed in a gas cabinet containing a multiplicity, e.g., three, sorbent vessels, each manifolded together for selective delivery of sorbate gas from one or more of such vessels. The cabinet may further include therein independent thermocouples, or other temperature sensing/monitoring equipment and components for preventing overheating of the vessels and/or other internal components of the gas cabinet in use thereof.

The cabinet may additionally include a fusible link heater element for selective augmentative heating of the vessels and sorbent therein; a sprinkler system; an exhaust heat sensor; a toxic gas monitor which functions to shut down the apparatus when toxic gas is sensed; a scrubber or bulk sorption device; and redundant pressure and temperature control means. With such a storage and delivery system apparatus, delivery rates of gas of 500 sccm at 15 psig are readily attainable.

The use of chemisorbent materials in the manner of the present invention therefore is a significant advance, in that the significant presence in the sorbent material of any water, metals, or transition metal oxides tends to promote undesirably high levels of decomposition of the sorbate gas. Concerning molecular sieve materials most specifically, a large number of such sorbents invariably contain clay or other mineralic binders which contain the aforementioned decomposition promoters, which undesirably degrade the performance of the storage and delivery system apparatus and method.

Figures 2, 3:
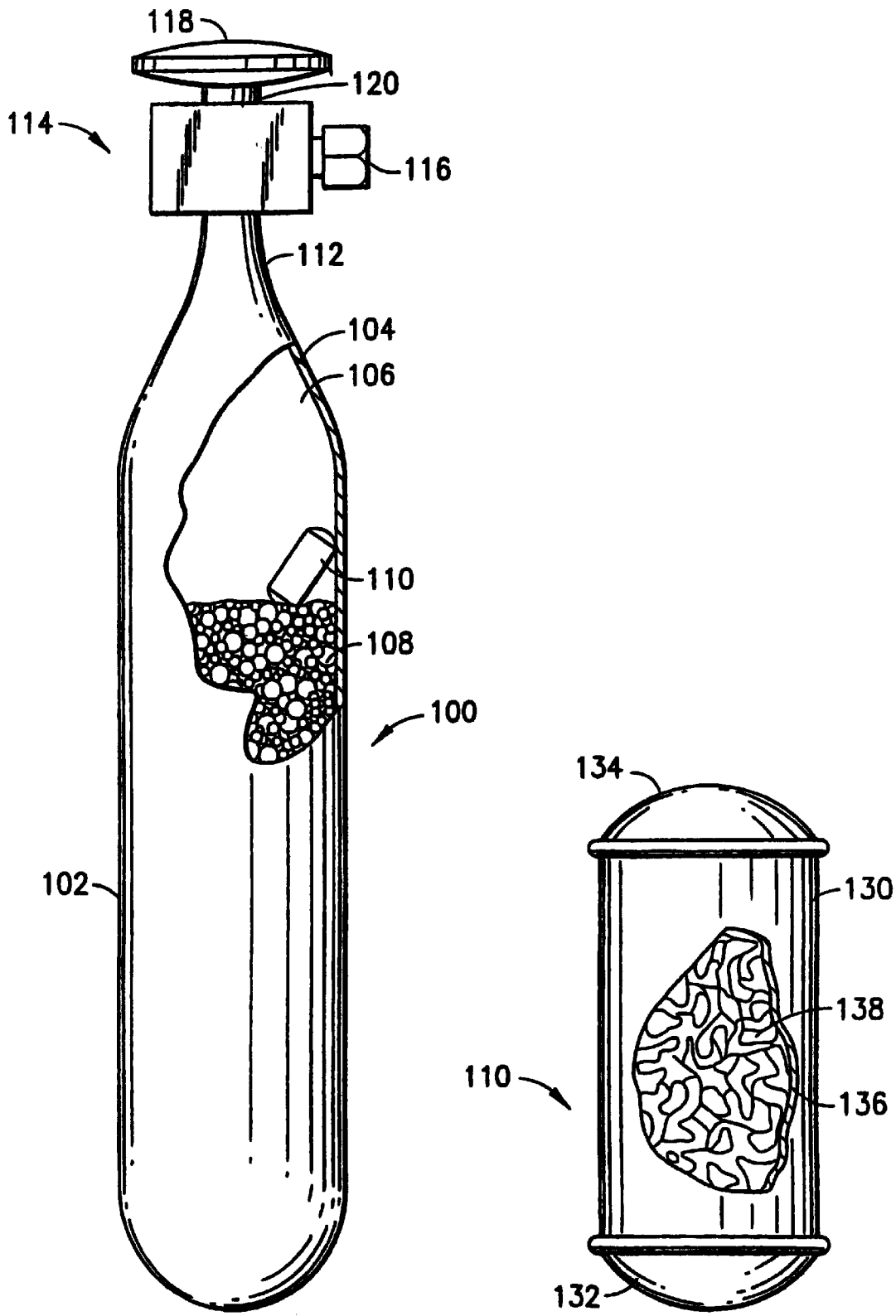
FIG. 2 is a schematic partially broken away elevation view of a storage and dispensing apparatus according to one embodiment of the invention, featuring an interiorly disposed chemisorbent capsule according to one aspect of the invention.
FIG. 3 is a schematic partially broken away elevation view of a chemisorbent capsule of the type shown in FIG. 2.

FIG. 2 shows a schematic representation of a storage and dispensing system 100 according to one embodiment of the present invention. The system comprises a storage and dispensing vessel 102 as shown, having a wall 104 bounding the interior volume 106 of the vessel. The vessel contains therein a bed 108 of physical sorbent material, and a capsule 110 holding a chemisorbent material for reaction with gas impurity species such as hydrogen, which may be produced when a sorbate hydride gas such as arsine or phosphine is decomposed.

The vessel shown in FIG. 2 has an upper neck portion 112 to which is joined a valve head assembly 114 including a valve therein. The valve in the valve head is selectively actuatable by hand wheel 118, mounted on spindle 120, and arranged to be actuated by manual rotation of the hand wheel, or translation thereof by automatic control means, such as for example a pneumatic valve actuator under the control of suitable computer or microprocessor and cycle timer or other computer software program.

The valve head has an outlet port 116, which may be coupled to a manifold or other flow dispensing assembly means.

In operation, the capsule, which may for example have a permeable membrane accommodating passage therethrough of hydrogen only, but not the hydride gas to be stored and selectively dispensed, receives the impurity species hydrogen through the membrane of the container. The hydrogen ingressing to the interior volume of the capsule thereupon contacts and reacts with the chemisorbent material to form solid reaction products with negligible vapor pressure. The arsine subsequently discharged from the vessel therefore contains no significant hydrogen therein. Further, the removal of hydrogen from the interior volume of the vessel has the advantage that the associated risk of fire and/or explosion is minimized. Finally, the removal of hydrogen from the interior volume removes a component of the gas phase that has the potential to increase the pressure in the vessel to unacceptably high levels if not removed.

The capsule 110 may therefore be readily disposed in the interior volume of the gas storage and dispensing vessel, being packaged initially in an inert, and hermetically sealed container or package, to prevent the premature combination of the chemisorbent with atmospheric trace amounts of hydrogen or other atmospheric gases that may in contact with the chemisorbent deplete its capability to remove gas impurities in situ when deployed in the vessel. As shown in FIG. 2, the capsule may be introduced to the interior volume of the cylinder after the cylinder has been loaded with sorbent material, so that the capsule is exposed to the head space gas.

The structure of the capsule is more fully shown in FIG. 3, and includes a main body portion 130 that is bounded by a permeation-selective membrane wall 136, in which the membrane is permeation-selective for decomposition products such as hydrogen, and optionally for other gases such as atmospheric in-leakage or outgassing species (nitrogen, oxygen). Atmospheric gases may leak into the vessel interior through the valve head assembly, or more typically may outgas from the interior vessel walls or even the sorbent material itself.

At the respective ends of the capsule are provided end caps 132 and 134 which mate with and are sealed to the main body portion 130 to form a unitary structure.

In the membrane-walled capsule 110 is disposed a macroporous medium 138 having a flashed getter thereon, such as a thin film of barium. The macroporous medium is a high surface area structure, and may be a skeletal macropore matrix, or any of conventional high surface area materials such as silica, alumina, molecular sieve, macroreticulate polymer resin (e.g., Amberlite® resin), etc.

The getter film therefore serves to irreversibly chemisorb the contaminant gases permeating through the membrane wall. For example, in the case of barium, the following reactions would occur:

$Ba+H_2 \rightarrow BaH_2$ $2Ba+O_2 \rightarrow 2BaO$ $Ba+N_2 \rightarrow BaN_2$ $Ba+HOH \rightarrow BaO+BaH_2$ The macroporous medium on which the getter film is supported preferably has a high specific heat character, to accommodate the exothermic reaction of the getter film with the contaminant gas. This will accommodate the heat of reaction within the capsule.

The permeation-selective membrane is selected to be impermeable to the stored sorbate gas.

The capsule 110 can be fabricated in a glove box under inert atmosphere, such as argon or nitrogen, and subsequently stored and then installed in the gas storage and dispensing cylinder under inert atmosphere.

In use, the getter capsule will maintain contaminant levels at near zero values, so that the dispensed gas is of high purity.

The fluid storage and dispensing means and method of the invention may be usefully employed for the delivery of reagents for various unit operations of semiconductor manufacturing processes.

For example, the semiconductor manufacturing process may include photolithography steps. Typically, a wafer undergoes between 12 and 20 photolithography steps during the manufacture of very large scale integrated (VLSI) and ultra large scale integrated (ULSI) circuits. The vapor pressure of HMDS, TMS, photoresist strippers and developers can be reduced in accordance with the process of the present invention, by adsorbing the process liquids on solid adsorbents retained in a storage and dispensing system according to the invention. The resulting safer sources of the process fluids can be used in standard wafer tracks systems, to coat, develop, and strip photoresists from wafers during photolithography steps in the manufacturing process flow.

The storage and dispensing system of the invention may also be utilized for in-situ cleaning or other cleaning operations, in which the cleaning fluid is stored in and dispensed from a fluid storage and dispensing system of the invention. In-situ cleaning reduces process related defects and increases tool utilization by extending maintenance cycles. Examples of chamber cleans used in semiconductor tools are (1) $NF_3$ cleans of W CVD tools, Ti/TiN sputter tools, and Ti/TiN hybrid sputter/CVD tools, and (2) 1,1,1-trichloroethane (TCA), trans-1,2-dichloroethane (t-DCE) and HF cleans of furnaces and single wafer polysilicon/$SiO_2$ (both doped and undoped) deposition tools.

Cleaning gases can be adsorbed on sorbent media in accordance with the present invention, to form low vapor pressure sources of such cleaning fluids, which significantly reduce the hazard potential of such gases during their transportation, storage and use. The process of the present invention may for example be practiced with gaseous cleaning agents such as $Cl_2$ (used with a plasma for Al deposition) to remove solid and/or chemical contaminants from chamber walls of process equipment.

Concerning semiconductor manufacturing processes for integrated circuit fabrication, a number of layers in standard silicon integrated circuits are deposited by chemical vapor deposition (CVD) using hazardous source materials. Examples include (1) CVD of polysilicon or epitaxial silicon, which are deposited using $SiH_4$, $Si_2H_6$ or $SiH_xCl_{4-x}$ (x=0–4) as the Si source, and these films are often doped with $PH_3$ or $B_2H_6$ or $AsH_3$, (2) CVD of $SiO_2$ which utilizes $SiHxCl_{4-x}$ (x=0–4) or tetraethylorthosilicate (TEOS) as the Si source, and a range of dopants including boron trichloride, trimethylborate, trimethylborite, triethylborate, triethylborite, phosphorous trichloride, trimethylphosphate, trimethylphosphite, triethylphoshate, triethylphosite, $PH_3$ or $B_2H_6$, (3) CVD of W which is carried out with $WF_6$ and sometimes $SiH_4$ or $Si_2H_6$ as a co-reactant, (4) CVD of TiN which utilizes $TiCl_4$ or tetrakisdimethylamidotitanium or tetrakis-diethylamidotitanium as the Ti source along with ammonia as the co-reactant, (5) CVD of $Si_3N_4$ which is grown with $SiHxCl_{4-x}$ (x=0–4) as the Si source and ammonia or a nitrogen plasma discharge. Some of the above processes are carried out by thermal CVD and many may be conducted as plasma-assisted CVD processes; other forms of assistance such as UV light may also be used.

These examples illustrate the use of hazardous gases or liquids whose safety in transportation and use can be improved by adsorbing such fluid-phase process reagents on a physical adsorbent material that decreases the vapor pressure of the hazardous gas or liquid to form a safer source of the process fluid in accordance with the present invention.

In addition to the above specific examples of fluid usages in the semiconductor manufacturing industry, many other fluid reagent process steps are involved in semiconductor manufacturing. Accordingly, the foregoing discussion is not meant to be inclusive, and the sorbent-based fluid storage and delivery systems of the present invention are additionally applicable to a wide variety of CVD processes utilizing hazardous materials, as well as other fluid-consuming operations practiced in the semiconductor manufacturing industry.

In the ensuing disclosure, the invention will be described with reference to a gas as the sorbate fluid, however, it will be recognized that the invention is broadly applicable to liquids, gases, vapors, and multiphase fluids, and contemplates storage and dispensing of fluid mixtures as well as single component fluids.

The fluid storage and dispensing vessel of the invention may also be provided with internal heating means (not shown) which serve to thermally assist desorption of the sorbate fluid. Preferably, however, the sorbate fluid is at least partially, and most preferably fully, dispensed from the storage and dispensing vessel containing the adsorbed fluid by pressure differential-mediated desorption. Such pressure differential may be established by flow communication between the storage and dispensing vessel, on the one hand, and the exterior dispensing environment or locus of use, on the other. The dispensing means for the vessel may include pumps, blowers, fans, eductors, ejectors, etc., or any other motive driver for flowing the fluid from the vessel to the locus of use of the dispensed fluid.

The sorbent material prior to its installation in the storage and dispensing vessel may be suitably processed or treated to ensure that it is devoid of trace components that may deleteriously affect the performance of the fluid storage and dispensing system. For example, the sorbent may be subjected to washing treatment, e.g., with hydrofluoric acid, to render it sufficiently free of trace components such as metals and oxidic transition metal species, or it may otherwise be heated or processed to ensure the desired purity and/or performance characteristics.

The sorbent may be provided in the form of particles, granules, extrudates, powders, cloth, web materials, honeycomb or other monolithic forms, composites, or other suitable conformations of useful sorbent materials, having sorptive affinity for the fluid to be stored and subsequently dispensed, and with satisfactory desorption characteristics for the dispensing operation.

Although it generally is preferred to operate solely by pressure differential at ambient temperature conditions, in respect of the sorption and desorption of the gas to be subsequently dispensed, the system of the invention may in some instances advantageously employ a heater operatively arranged in relation to the storage and dispensing vessel for selective heating of the solid-phase physical sorbent medium, to effect thermally-enhanced desorption of the sorbed fluid from the solid-phase physical sorbent medium.

The present invention as mentioned may beneficially employ the fluid storage and dispensing means and method for the delivery of reagents in a wide variety of unit operations of semiconductor manufacturing process systems.

Figure 4:
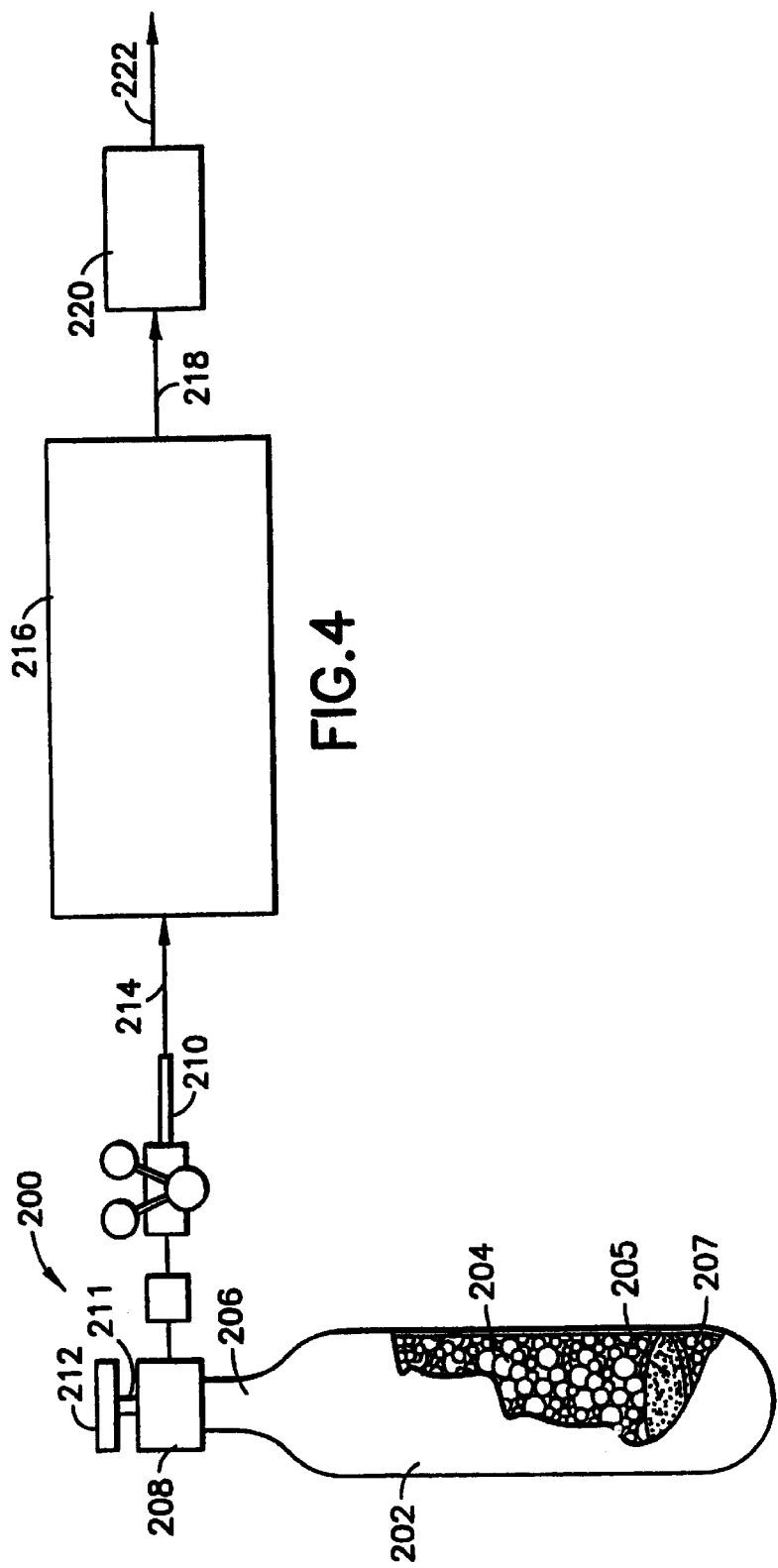
FIG. 4 is a schematic perspective view of a storage and dispensing vessel according to one embodiment of the present invention, shown in fluid dispensing relationship to a semiconductor manufacturing process system.

FIG. 4 is a schematic perspective view of a storage and dispensing system 200 according to one embodiment of the present invention, shown in fluid dispensing relationship to a semiconductor manufacturing process system 216.

The storage and dispensing system 200 comprises a storage and dispensing vessel 202 holding a bed 204 of sorbent material. The bed 204 of sorbent material is reposed in the vessel interior on an impurity-permeable membrane 205, which is sealed at its perimeter to the interior wall surface of the vessel 202. Below the membrane 205 is a bed 207 of chemisorbent, so that in use of the vessel, the impurity species will permeate through the membrane and react with the chemisorbent, to effect removal of the impurities from the interior volume of the vessel.

The neck region 206 of the vessel 202 is joined to valve head 208, to which is joined a manually adjustable wheel 212 via valve stem 211, so that rotation of the wheel 212 opens the vessel to the flow of desorbate gas through gas discharge 210 to line 214 for flow to the semiconductor manufacturing operation 216. Following its use in the semiconductor manufacturing operation 216, the used gas may be passed in line 218 to the treatment complex 220, for treatment therein, and subsequent discharge from the system in line 222.

The semiconductor manufacturing process system 216 shown in FIG. 4 may suitably comprise wafer photolithography steps for the manufacture of VLSI and ULSI circuits. Sorbable fluids such as HMDS and TMS, and photoresist strippers and developers, can he adsorbed on solid adsorbents, such as carbon sorbents, polymeric sorbents including materials such as macroreticulate polymers of the type commercially available from Rohm & Haas Chemical Company (Philadelphia, Pa.) under the trademark "Amberlite," silica, alumina, aluminosilicates, etc., for use in accordance with the process of the invention.

The sorbate gas storage and dispensing systems of the present invention may therefore be employed in wafer tracks processes, for the purpose of coating, developing, and stripping photoresist from the wafers during photolithography steps in the manufacturing process flow.

The semiconductor manufacturing process system 216 may also involve fluid storage and dispensing of cleaning reagents, to carry out in-situ cleaning, and reduce process-related defects and increase tool utilization by extending maintenance cycles.

Illustrative cleaning reagents and appertaining semiconductor tools have been described hereinabove. In use, cleaning reagents may be sorptively retained in the storage and dispensing vessel (containing sorbent material having sorptive affinity for the fluid reagent), for storage and selective on-demand dispensing of reagents such as $NF_3$, hydrogen fluoride, 1,1,1-trichloroethane, and trans-1,2-dichloroethane, chlorine, hydrogen chloride, etc.

The process of the present invention may be usefully employed for chemical vapor deposition of thin film materials, using CVD precursors such as silanes, chlorosilanes, tetraethylorthosilicate, tungsten hexafluoride, disilane, titanium tetrachloride, tetrakisdimethylamidotitanium, tetrakisdiethylamidotitanium, ammonia or other nitrogenous material, etc., and dopant materials such as boron, phosphorus, arsenic and antimony source reagents. Examples of such dopant source reagents include borane, boron trichloride, boron trifluoride, trimethylborate, trimethylborite, triethylborate, triethylborite, phosphorous trichloride, trimethylphosphate, trimethylphosphite, triethylphosphate, triethlyphosphite, phosphine, arsine, diborane, etc., including deuterated and tritiated analogs of the foregoing hydrogen-containing dopant source reagents.

In general, the process of the present invention may be usefully employed in any instance where a fluid used in the fabrication of semiconductor device structures, either as a source material for material incorporated on or in a substrate or precursor device structure, or alternatively a process reagent such as an etchant, mask, resist, wash or other cleaning fluid, etc., is retainable in a vessel containing a sorbent material having sorptive affinity for the fluid. The fluid may be gas, vapor, liquid or other multi-phase composition, but the invention preferably utilizes a vapor or gas fluid which is sorptively retained by the sorbent medium in the storage and dispensing vessel.

Process steps with which the gas storage and dispensing methodology of the invention may be usefully employed, include, but are not limited to, ion implantation, epitaxial growth, plasma etching, reactive ion etching, metallization, physical vapor deposition, doping and chemical vapor deposition.

A variety of electronic device structures may be formed in accordance with the invention utilizing a process fluid dispensed from a storage and dispensing system of the invention. Examples of such electronic device structures include, but are not limited to, transistors, capacitors, resistors, memory cells, dielectric materials, varied doped substrate regions, metallization layers, channel stop layers, source layers, gate layers, drain layers, oxide layers, field emitter elements, passivation layers, interconnects, polycides, electrodes, trench structures, ion implanted material layers, via plugs, and precursor structures for the foregoing electronic device structures, as well as device assemblies comprising more than one of the foregoing electronic device structures.

The electronic device structure may for example comprise a memory chip device, such as a ROM, RAM, SRAM, DRAM, PROM, EPROM, EEPROM, and flash memory chips. Alternatively, the electronic device structure may comprise a semiconductor logic chip, such as a microcontroller chip or a microprocessor chip.

End use electronic products of the process of the invention include telecommunications devices, products such as computers, personal digital assistants, telephones, flat panel displays, monitors, sound systems, electronic games, virtual reality devices, and smart consumer appliances and consumer appliances such as cooking appliances, refrigerators, freezers, dishwashers, clothes washing machines, clothes dryers, humidifiers, dehumidifiers, air conditioners, global positioning devices, lighting systems, and remote controllers for the foregoing.

In one preferred aspect, the fluid source in the storage and dispensing vessel is selectively supplied to the semiconductor manufacturing process system for ion implantation, in which the fluid source for the ion implantation may for example be constituted by a metal organic composition whose metal moiety is a metal such as for example aluminum, barium, strontium, calcium, niobium, tantalum, copper, platinum, palladium, iridium, rhodium, gold, tungsten, titanium, nickel, chromium, molybdenum, vanadium, or combinations of two or more of the foregoing.

FIG. 5 is a schematic representation of an ion implant process system 300 including a storage and dispensing vessel 302 containing a sorbent material 306 in its interior volume holding arsine gas which is supplied for ion implantation doping of a substrate 328 in the illustrated ion implant chamber 301. The sorbent material may optionally have associated therewith a chemisorbent material for take-up of impurity species in the vessel.

The storage and dispensing vessel 302 comprises a vessel wall 304 enclosing an interior volume holding the sorbent material 306, which may be in a bead, particle or other finely divided form. A sorbate gas is retained in the interior volume of the vessel on the sorbent material.

The storage and dispensing vessel 302 includes a valve head 308 coupled in gas flow communication with a discharge line 312. A pressure sensor 310 is disposed in the line 312, together with a mass flow controller 314; other monitoring and sensing components may be coupled with the line, and interfaced with control means such as actuators, feedback and computer control systems, cycle timers, etc.

The ion implant chamber 301 contains an ion beam generator or ionizer 316 receiving the dispensed gas, e.g., arsine, from line 312 and generating an ion beam 305. The ion beam 305 passes through the mass analyzer unit 322 which selects the ions needed and rejects the non-selected ions.

The selected ions pass through the acceleration electrode array 324 and then the deflection electrodes 326. The resultantly focused ion beam is impinged on the substrate element 328 disposed on the rotatable holder 330 mounted in turn on spindle 332. The ion beam of $As^+$ ions is used to n-dope the substrate as desired to form an n-doped structure.

The respective sections of the ion implant chamber 301 are exhausted through lines 318, 340 and 344 by means of pumps 320, 342 and 346, respectively.

FIG. 6 is a schematic cross-sectional elevation view of an NMOS transistor structure 400 which may be formed in a process system of the type shown in FIG. 5, comprising n-doped source 404 and n-doped drain 410 regions. The substrate 402 may for example be a p-type substrate having a gate oxide layer 408 with a gate layer 406 thereon. The n-doped source and drain regions may be formed by implantation of $As^+$ ions impinged on the substrate at a suitable energy, e.g., 110 KeV, to yield regions 404 and 410 doped at an appropriate flux, as for example $10^{15}$ ions per square centimeter, for the desired end use transistor structure.

In the fabrication of the structure shown in FIG. 6 in accordance with the present invention, the $As^+$ ions may be formed by introduction of arsine or other arsenic precursor gas species from the storage and dispensing vessel in which the precursor gas is sorptively stored at a suitable pressure, e.g., in the range of 600–750 Torr so as to be at substantially atmospheric pressure.

Figure 7:
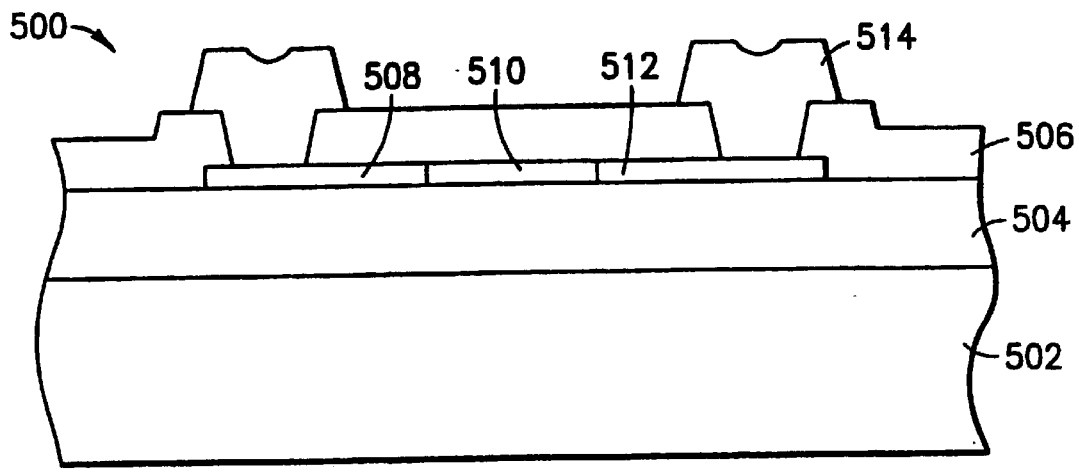
FIG. 7 is a cross-sectional elevation view of a portion of a static random access memory (SRAM) structure comprising structural features formed with the use of gas reagents dispensed from a storage and dispensing vessel of the type shown in FIG. 1.

FIG. 7 is a cross-sectional elevation view of a portion of a static random access memory (SRAM) structure 500 comprising structural features formed with the use of gas reagents dispensed from a storage and dispensing vessel of the type shown in FIG. 1.

The SRAM structure 500 comprises a substrate 502 which may for example comprise p-type silicon, on which is deposited oxide layer 504 which may comprise $SiO_2$ formed by epitaxial thin film deposition from a silicon source precursor such as those identified hereinabove, supplied from a fluid storage and dispensing vessel in accordance with the present invention.

Alternatively, the oxide layer 504 may be formed by oxidation of the substrate 502 to form layer 504 thereon, utilizing an oxidizing agent which is dispensed from a fluid storage and delivery vessel in accordance with the process of the present invention.

Overlying the oxide layer 504 is a polysilicon resistor element 510 flanked by layer regions 508 and 512, which may be suitably doped with an n-dopant such as $As^+$, or antimony or phosphorous dopant species, to provide the n-doped flanking regions. The overlying dielectric layer 506 may be formed of silica, by chemical vapor deposition, as previously described in connection with the formation of layer 504. The silica layer 506 as shown has been etched away by a fluid-phase etchant which may be appropriately dispensed from a storage and dispensing vessel in accordance with the process of the present invention, to provide wells or trenches for metallization elements 514.

The fabrication process for the polysilicon resistor structure of the SRAM cell shown in FIG. 7 may therefore be carried out with dispensing of process fluids for the constituent process steps of ion implantation, chemical vapor deposition, etching and metallization. It will be appreciated that the process steps of the invention may be carried out in a fluid environment, at the locus of fabrication, which interacts, supports or otherwise facilitates the utilization of the dispensed fluid in the fabrication process of the electronic device structure.

Figure 8:
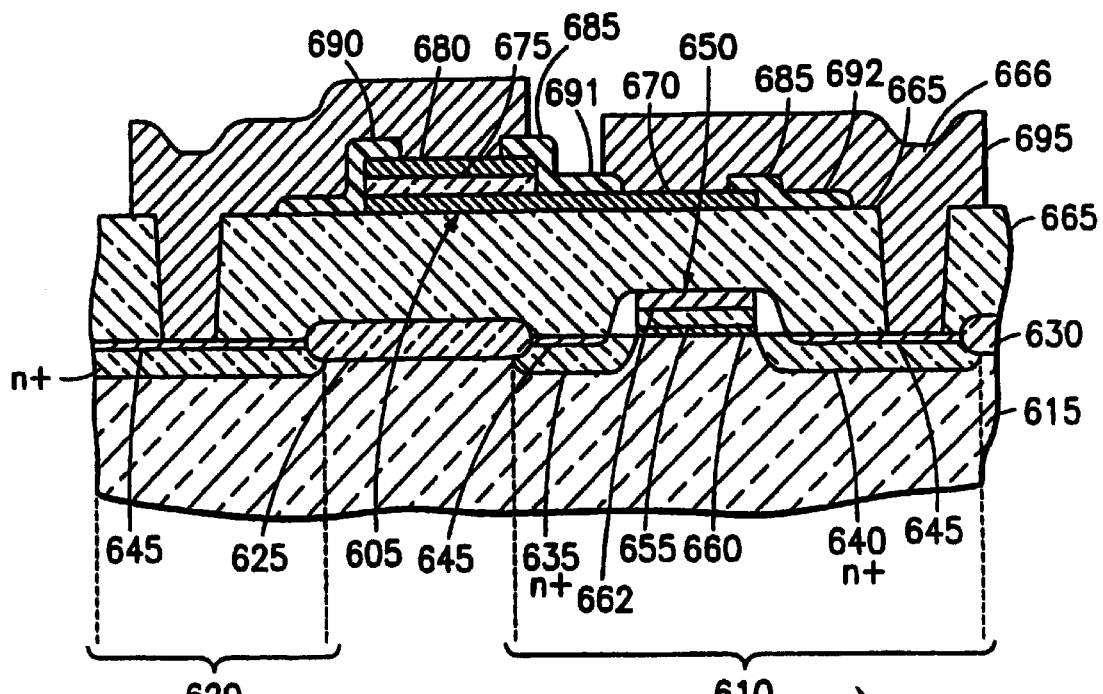
FIG. 8 is a schematic representation of a portion of an integrated circuit with an integrated capacitor, such as may be fabricated in accordance with the process of the present invention.

FIG. 8 is a schematic representation of a portion of an integrated circuit structure including an integrated capacitor, which may be fabricated in accordance with the process of the present invention.

The illustrated portion of integrated circuit includes a first active device 610, such as a conventional metal-oxide-semiconductor field effect transistor (MOSFET), and a capacitor 605 employing a dielectric film layer, such as a layer of barium strontium titanate (BST) formed on a substrate 615, such as a silicon substrate. A drain region of a second transistor 610 is also illustrated.

The specific type of active devices employed in this structure may constitute NMOS, PMOS or CMOS structures, as may be desired for the end use application of the integrated circuit. Other potentially useful active devices in such structure include, for example, bipolar junction transistors and gallium arsenide MESFETs. The transistors 610 and 620 can be fabricated by processing methods utilizing reagents dispensed from sorbent storage and dispensing systems in accordance with the process of the invention.

In FIG. 8, the transistors 610 and 620 include field oxide regions 625 and 630 which are formed, for example, by $SiO_2$ and operate as insulators between the transistor 610 and adjacent devices such as transistor 620.

Source and drain regions 635 and 640 of the transistor 610 are formed by doping with n-type impurities, such as arsenic or phosphorous for NMOS structures. An optional layer of silicide 645 is deposited over the source and drain regions 635 and 640 to reduce the source and drain resistance, which enables greater current delivery by the transistor 610.

A gate 650 of the transistor 610 includes, for example, polysilicon 655 doped with an n-type impurity, such as by ion implantation or vapor doping, utilizing a fluid dispensed from a storage and dispensing vessel in according with the process of the invention. The gate polysilicon 655 is disposed on a $SiO_2$ spacer 660. An optional layer of silicide 682 is also deposited over the gate polysilicon 655 to reduce the electrical resistance of the gate 650. An insulating layer 665 of, for example, P-glass which is oxide doped with phosphorous is then deposited on the transistors 610 and 620, to provide protection to the transistors and facilitate electrical connection.

Contact windows 666 are then etched in the insulating layer 665 to expose the device gate 650 and source and drain regions, such as the regions 635 and 640. Although only the drain regions of the transistors 610 and 620 are exposed in the cross-section of the integrated circuit illustrated in FIG. 8, it will be readily appreciated that the gate and source are exposed to other areas of the integrated circuit 601, outside the illustrated cross-section.

At least one capacitor such as the capacitor 605 illustrated in FIG. 8 is formed on the integrated circuit, such as on the insulating layer surface. The capacitor 605 includes a first electrode 670 formed on the insulating layer surface, a dielectric thin film region 675 on the first electrode 670, and a second electrode 680 formed on the dielectric film region 675 opposite the first electrode 670. It is possible for the first electrode 670 to have a two-layer structure, e.g., a layer of platinum over a layer of titanium nitride. Platinum is a suitable electrode material, however, it reacts adversely with silicon. In consequence, a diffusion barrier is usefully employed as the second electrode layer which is in contact with the insulating layer surface to preclude such chemical reaction between platinum and the silicon of the substrate 615. Suitable thicknesses for each layer of the two-layer structure may be in the range of from about 0.01 to about 0.5 micrometer.

Alternatively, the integrated circuit of the general type shown in FIG. 8 may be formed with deposition of an electrically conductive interconnection layer on the surface of the insulating layer 665 in specific patterns to electrically connect devices via the etched regions and other circuit components in a desired manner.

As a further alternative construction of the device structure shown in FIG. 8, it is possible for the first electrode 670 to be a single layer structure of appropriate conductive material. Overall suitable thicknesses for the first electrode 670, whether a 1- or a 2-layer structure, may be in the range of from about 0.1 to about 0.5 micrometers. The first electrode 670 is suitably larger than the second electrode 680 to provide electrical connection to the first electrode 670.

After formation of the capacitor 605, an insulating material 685, such as for example $SiO_2$, is deposited on edge regions 690, 691 and 692 of the capacitor 605, to prevent short circuits between the first and second capacitor electrodes 670 and 680 when the interconnection layer is formed. An interconnection layer 695 then is formed on the insulation layer and correspondingly etched contact windows to electrically connect the devices 610 and 620 and the capacitors 605 in a desired manner. Suitable materials for the interconnection layer 695 include aluminum and/or copper, which may be deposited from corresponding metalorganic precursors dispensed from the sorbent storage and dispensing vessel in accordance with the process of the invention. In the integrated circuit 601, the drain 640 of the transistor 610 is electrically connected to the first electrode 670 of the capacitor 680 and the second electrode 680 of the capacitor is electrically connected to the source of the transistor 620.

It will be appreciated from the foregoing description that the invention may be carried out to deliver any of a wide variety of semiconductor manufacturing reagents in the semiconductor manufacturing plant, with the choice of the sorbent medium, and the mode of dispensing being readily determinable without undue experimentation by the skilled artisan, by simple adsorption and desorption tests to determine proper materials and process conditions.

Thus, while the invention has been shown and described with reference to specific features, aspects and embodiments herein, it will be appreciated that the invention is susceptible of a wide variety of other embodiments, features and implementations consistent with the disclosure herein. The invention as claimed is therefore to be broadly construed and interpreted, within the spirit and scope of the foregoing disclosure.

What is claimed is:

1. A process for supplying a reagent gas, comprising:

providing a storage and dispensing vessel containing a solid-phase physical sorbent medium having the reagent gas physically adsorbed thereon;

chemisorbing gas phase impurities of the reagent gas in the storage and dispensing vessel for gas phase removal thereof, desorbing reagent gas from the physical sorbent medium; and discharging the desorbed reagent gas from the storage and dispensing vessel.

2. A process for fabricating an electronic device structure on or in a substrate, comprising:

providing a storage and dispensing vessel containing a physical sorbent medium having physically adsorbed thereon a fluid for fabrication of the electronic device structure;

desorbing the fluid from the physical sorbent medium and dispensing the fluid from the storage and dispensing vessel; and contacting the substrate with the dispensed fluid from the storage and dispensing vessel, under conditions effective to utilize the fluid or a constituent thereof on or in the substrate, wherein the storage and dispensing vessel further contains a chemisorbent for impurities of the fluid, whereby the fluid is able to be dispensed in a high purity condition.

3. A process according to claim 2, wherein the contacting step includes a process step selected from the group consisting of:

(a) ion implantation;
(b) epitaxial growth;
(c) plasma etching;
(d) reactive ion etching;
(e) metallization;
(f) physical vapor deposition;
(g) chemical vapor deposition;
(h) photolithography;
(i) cleaning; or
(j) doping.

4. A process according to claim 2, wherein the electronic device structure is selected from the group consisting of:

(a) transistors;
(b) capacitors;
(c) resistors;
(d) memory cells;
(e) dielectric materials;
(f) buried doped substrate regions;
(g) metallization layers;
(h) channel stop layers;
(i) source layers;
(j) gate layers;
(k) drain layers;
(l) oxide layers;
(m) field emitter elements;
(n) passivation layers;
(o) interconnects;
(p) polycides;
(q) electrodes;
(r) trench structures;
(s) ion implanted material layers;
(t) via plugs;
(u) precursor structures for the foregoing (a)–(t) electronic device structures; and
(v) device assemblies comprising more than one of the foregoing (a)–(t) electronic device structures.

5. A process according to claim 2, wherein the electronic device structure comprises a memory chip device.

6. A process according to claim 5, wherein the memory chip device comprises a device selected from the group consisting of:

(i) ROM chips;
(ii) RAM chips;
(iii) SRAM chips;
(iv) DRAM chips;
(v) PROM chips;
(vi) EPROM chips;
(vii) EEPROM chips; and
(viii) flash memory chips.

7. A process according to claim 2, wherein the electronic device structure comprises a semiconductor logic chip.

8. A process according to claim 2, wherein the electronic device structure comprises a semiconductor logic chip selected from the group consisting of microcontrollers and microprocessors.

9. A process according to claim 2, wherein the electronic device structure comprises a microcontroller.

10. A process according to claim 2, wherein the electronic device structure comprises a microprocessor.

11. A process according to claim 2, wherein the contacting step comprises ion implantation.

12. A process according to claim 11, wherein the fluid for the ion implantation comprises a metalorganic composition whose metal moiety is selected from the group consisting of aluminum, barium, strontium, calcium, niobium, tantalum, copper, platinum, palladium, iridium, rhodium, gold, tungsten, titanium, nickel, chromium, molybdenum, vanadium, and combinations of the foregoing.

13. A process according to claim 2, wherein the contacting step comprises chemical vapor deposition.

14. A process according to claim 2, wherein the contacting step comprises chemical vapor deposition of polysilicon.

15. A process according to claim 2, wherein the contacting step comprises forming a doped polysilicon material on the substrate.

16. A process according to claim 2, wherein the physical sorbent medium comprises a sorbent material selected from the group consisting of carbonaceous materials, silica, alumina, aluminosilicates, kieselguhr and polymeric sorbent materials.

17. A process according to claim 2, wherein the contacting step comprises chemical vapor deposition carried out with a precursor selected from the group consisting of:

silane;
disilane;
chlorosilanes;

tungsten hexafluoride;
trichlorotitanium;
tetrakisdimethylamidotitanium;
tetrakisdiethylamidotitanium;
ammonia;
tetraethylorthosilicate;
arsine;
phosphine;
borane;
diborane;
boron trifluoride;
boron trichloride;
trimethylborate;
trimethylborite;
triethylborate;
triethylborite;
phosphorous trichloride;
trimethylphosphate;
trimethylphosphite;
triethylphosphate; and
triethylphosphite.

18. A process for fabricating an electronic device structure on or in a substrate, comprising:
    providing a storage and dispensing vessel containing a physical sorbent medium having physically adsorbed thereon a source fluid for a material constituent of the electronic device structure;
    desorbing source fluid from the physical sorbent medium and dispensing source fluid from the storage and dispensing vessel;
    contacting the substrate with dispensed source fluid from the storage and dispensing vessel, under conditions effective to deposit the material constituent on or in the substrate; and
    chemisorbing impurities present in the vessel which otherwise would reduce the purity of the dispensed fluid.

19. A process for fabricating an electronic device structure on or in a substrate, comprising:
    providing a storage and dispensing vessel containing a physical sorbent medium having physically adsorbed thereon a fluid for fabrication of the electronic device structure, which is utilized in the fabrication of the electronic device structure, but which does not form a material constituent of the electronic device structure;
    desorbing the fluid from the physical sorbent medium and dispensing the fluid from the storage and dispensing vessel; and
    contacting the substrate with the dispensed fluid from the storage and dispensing vessel, under conditions effective to utilize the fluid or a constituent thereof on or in the substrate,
    wherein the storage and dispensing vessel contains a chemisorbent for impurities of the fluid, whereby the fluid is able to be dispensed in a high purity condition.

20. A sorbent-based gas storage and dispensing system, comprising:
    a storage and dispensing vessel containing a solid-phase physical sorbent medium having a sorbate gas physically adsorbed thereon;
    a chemisorbent material in the storage and dispensing vessel, having chemisorptive affinity for an impurity of the sorbate gas, and arranged to chemisorb said impurity for gas phase removal thereof in the storage and dispensing vessel;
    a dispensing assembly coupled in gas flow communication with the storage and dispensing vessel, for selectively discharging desorbed sorbate gas from the storage and dispensing vessel.

21. A sorbent-based gas storage and dispensing system according to claim 20, wherein the chemisorbent material is shielded from contact with the sorbate gas by a barrier member permeable to the impurity but impermeable to the sorbate gas.

22. A sorbent-based gas storage and dispensing system according to claim 21, wherein the barrier member comprises a permselective membrane.

23. A sorbent-based gas storage and dispensing system according to claim 22, wherein the permselective membrane is formed of a material of construction selected from the group consisting of polypropylene, polyvinylidene fluoride, polytetrafluoroethylene, polyfluoroacetate, silicone, surface-treated glass fabrics, and polyphenylene oxide film.

24. A sorbent-based gas storage and dispensing system according to claim 20, wherein the chemisorbent material is contained in a capsule including a membrane permeable to the impurity but not to the sorbate gas.

25. A sorbent-based gas storage and dispensing system according to claim 24, wherein the chemisorbent material is supported on a support matrix in the interior of the capsule.

26. A sorbent-based gas storage and dispensing system according to claim 20, wherein the chemisorbent material is selected from the group consisting of:
    (A) Group II metals;
    (B) scavengers including a support having associated therewith, but not covalently bonded thereto, a compound which in the presence of such contaminant provides an anion which is reactive to effect the removal of such impurity, such compound being selected from one or more members of the group consisting of:
        (i) carbanion source compounds whose corresponding protonated carbanion compounds have a $pK_a$ value of from about 22 to about 36; and
        (ii) anion source compounds formed by reaction of the carbanion source compounds with the sorbate gas; and
    (C) scavengers comprising:
        (i) an inert support having a surface area in the range of from about 50 to about 1000 square meters per gram, and thermally stable up to at least about 250° C.; and
        (ii) an active scavenging species, present on the support at a concentration of from about 0.01 to about 1.0 moles per liter of support, and formed by the deposition on the support of a Group IA metal selected from sodium, potassium, rubidium, and cesium and their mixtures and alloys and pyrolysis thereof on said support.

27. A sorbent-based gas storage and dispensing system according to claim 20, wherein the chemisorbent material is selected from the group consisting of: barium, strontium, calcium, and magnesium.

28. A sorbent-based gas storage and dispensing system according to claim 20, wherein the chemisorbent material is selected from the group consisting of: trityllithium and potassium arsenide.

29. A sorbent-based gas storage and dispensing system according to claim 20, wherein the chemisorbent material is provided as a separate bed of material in impurity gas flow communication with a bed of physical sorbent medium.

30. A sorbent-based gas storage and dispensing system according to claim 20, wherein the chemisorbent is dispersed throughout a bed of physical sorbent medium in the storage and dispensing vessel.

31. A sorbent-based gas storage and dispensing system according to claim 20, wherein the solid-phase physical sorbent medium comprises a material selected from the group consisting of crystalline aluminosilicates, alumina, silica, carbon, macroreticulate polymers, and kieselguhr.

32. A sorbent-based gas storage and dispensing system according to claim 20, wherein the chemisorbent material is provided in the storage and dispensing vessel in the form of a thin metal film.

33. A sorbent-based gas storage and dispensing system according to claim 32, wherein the chemisorbent material thin metal film comprises a material selected from the group consisting of barium, strontium, calcium, and magnesium.

34. A sorbent-based gas storage and dispensing system according to claim 20; wherein the chemisorbent material is segregated in a region of the interior volume of the storage and dispensing vessel.

35. A semiconductor manufacturing facility including a semiconductor manufacturing apparatus utilizing a gas reagent, and a gas reagent source therefor that is coupled in gas flow communication with the semiconductor manufacturing apparatus, wherein the gas reagent source comprises:
 a storage and dispensing vessel containing a solid-phase physical sorbent medium having a sorbate gas physically adsorbed thereon;
 a dispensing assembly coupled in gas flow communication with the storage and dispensing vessel, for selectively discharging desorbed sorbate gas from the storage and dispensing vessel; and
 optionally a chemisorbent material in the storage and dispensing vessel, having chemisorptive affinity for an impurity of the sorbate gas, and arranged to chemisorb said impurity for gas phase removal thereof in the storage and dispensing vessel.

36. A capsule for reactively sorbing an impurity gas in an environment latently susceptible to the presence of same, said capsule comprising a permselective membrane wall defining therewithin an interior volume of the capsule, and a chemisorbent material reactive with the impurity gas upon permeation of the impurity gas through the permselective membrane and contact with the chemisorbent material.

37. A capsule according to claim 36, wherein the chemisorbent material is supported on a support matrix in the interior volume of the capsule.

38. A capsule according to claim 36, wherein the chemisorbent material is selected from the group consisting of:
 (A) Group II metals;
 (B) scavengers including a support having associated therewith, but not covalently bonded thereto, a compound which in the presence of such contaminant provides an anion which is reactive to effect the removal of such impurity, such compound being selected from one or more members of the group consisting of:
  (i) carbanion source compounds whose corresponding protonated carbanion compounds have a $pK_a$ value of from about 22 to about 36; and
  (ii) anion source compounds formed by reaction of the carbanion source compounds with the sorbate gas; and
 (C) scavengers comprising:
  an inert support having a surface area in the range of from about 50 to about 1000 square meters per gram, and thermally stable up to at least about 250° C.; and
  an active scavenging species, present on the support at a concentration of from about 0.01 to about 1.0 moles per liter of support, and formed by the deposition on the support of a Group IA metal selected from sodium, potassium, rubidium, and cesium and their mixtures and alloys and pyrolysis thereof on said support.

39. A capsule according to claim 36, wherein the chemisorbent material is selected from the group consisting of: barium, strontium, calcium, and magnesium.

40. A capsule according to claim 36, wherein the chemisorbent material is selected from the group consisting of: trityllithium and potassium arsenide.

* * * * *

UNITED STATES PATENT AND TRADEMARK OFFICE
CERTIFICATE OF CORRECTION

PATENT NO : 6,132,492
DATED : Oct. 17, 2000
INVENTOR(S) : Steven J. Hultquist, Glenn M. Tom, Peter S. Kirlin, James V. McManus It is certified that error appears in the above-identified patent and that said Letters Patent are hereby corrected as shown below:

Column 4, line 63 change "Kureha" to - - Kreha - -.

Column 21, line 64 change " 682 " to - - 662 - -.

Signed and Sealed this

Twenty-second Day of May, 2001

NICHOLAS P. GODICI

*Attest:*

*Attesting Officer*     Acting Director of the United States Patent and Trademark Office